Patented July 4, 1950

2,514,188

UNITED STATES PATENT OFFICE 2,514,188

STANNOUS DIPHENOL SULFOXIDES

Harry E. Albert, Akron, Ohio, assignor to The Firestone Tire & Rubber Company, Akron, Ohio, a corporation of Ohio No Drawing. Application November 15, 1947, Serial No. 786,339

4 Claims. (Cl. 260—429)

This invention relates to the stannous diphenol sulfoxides. These new compounds are stabilizers for synthetic rubbers and particularly the rubber-like copolymer of butadiene and styrene, known as GR-S.

The stannous diphenol sulfoxides of this invention include the stannous di(halogen-substituted phenol) sulfoxides and the stannous di(hydrocarbon-substituted phenol) sulfoxides, as for example:

Stannous di(p-phenylphenol) sulfoxide
Stannous di(p-stearylphenol) sulfoxide
Stannous di(2,4-di-tert-octylphenol) sulfoxide
Stannous di(4-tert-butylphenol) sulfoxide
Stannous di(4-tert-amylphenol) sulfoxide
Stannous di(4-tert-octylphenol) sulfoxide
Stannous di(p-cresol) sulfoxide
Stannous di(o-cresol) sulfoxide
Stannous di(m-cresol) sulfoxide
Stannous di(4-tert-butyl-3-methylphenol) sulfoxide
Stannous di(p-chlorophenol) sulfoxide
Stannous di(p-sec-butylphenol) sulfoxide Other alkyl- and halo- substituted diphenol sulfoxides, etc. including di(halo-and-alkyl-substituted phenol) sulfoxides may be used.

The stannous diphenol sulfoxide is preferably prepared from stannous chloride and the alkali metal salt of the sulfoxide under anhydrous conditions. However, active compounds, undoubtedly containing some partially hydrolyzed salt, can be obtained using an aqueous medium. Reference to the stannous compound includes such partially hydrolyzed salts.

The following illustrates the preparation of the sulfoxide:

Stannous diphenol sulfoxide

One and seven-tenths grams of sodium hydroxide in 200 milliliters of distilled water was used to dissolve 6 grams of di(p-hydroxyphenyl) sulfoxide. Eight grams of stannous chloride (SnCl$_2$) were dissolved in 15 to 20 milliliters of distilled water and added to the above solution slowly during stirring. The white precipitate formed was filtered off, washed with water, and dried at 50 to 60° C. for 5 hours. It weighed 9.3 grams and was a very light cream color.

The stannous salt of diphenol sulfoxide may also be made in the following manner:

Four and six-tenths grams of sodium was dissolved in 400 milliliters of anhydrous methanol and 23.4 grams of purified di-phenol sulfoxide was dissolved in the resulting solution. To this a solution of 18.9 grams of anhydrous stannous chloride was added slowly during stirring. The precipitate was filtered, washed with methanol, and dried. After leaching with water and drying it weighed 20.7 grams. On heating, the product decomposed before it melted.

The example is illustrative. Variations may be made within the scope of the invention which is defined by the appended claims. The use of the stannous diphenol sulfoxides as stabilizers of synthetic rubbers is claimed and more particularly described in my application Serial No. 129,201 filed November 2, 1949.

What I claim is:

1. A stannous diphenol sulfoxide.
2. Stannous diphenol sulfoxide.
3. Stannous di(hydrocarbon-substituted phenol) sulfoxide.
4. Stannous di(halogen-substituted phenol) sulfoxide.

HARRY E. ALBERT.

REFERENCES CITED

The following references are of record in the file of this patent:

UNITED STATES PATENTS

| Number | Name | Date |
|---|---|---|
| 2,267,777 | Yngve | Dec. 30, 1941 |
| 2,270,183 | Cook | Jan. 13, 1942 |
| 2,366,874 | Reiff | Jan. 9, 1945 |
| 2,382,812 | Parker | Aug. 14, 1945 |
| 2,429,080 | Sterrett | Oct. 14, 1947 |